United States Patent
Chaturvedi et al.

(10) Patent No.: US 12,197,441 B1
(45) Date of Patent: Jan. 14, 2025

(54) PAGINATED SYNCHRONOUS DATABASE QUERYING

(71) Applicant: Amazon Technologies, Inc., Seattle, WA (US)

(72) Inventors: Kanishka Chaturvedi, Seattle, WA (US); Sudipto Das, Redmond, WA (US); Dhruv Goel, Bellevue, WA (US); Tiratat Patana-anake, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 281 days.

(21) Appl. No.: 17/491,103

(22) Filed: Sep. 30, 2021

(51) Int. Cl.
*G06F 16/2453* (2019.01)

(52) U.S. Cl.
CPC .. *G06F 16/24549* (2019.01); *G06F 16/24542* (2019.01)

(58) Field of Classification Search
None
See application file for complete search history.

(56) References Cited

U.S. PATENT DOCUMENTS

| | | | |
|---|---|---|---|
| 8,336,051 B2 | 12/2012 | Gokulakannan | |
| 8,478,743 B2 | 7/2013 | Chandramouli et al. | |
| 10,366,056 B2 | 7/2019 | Levine et al. | |
| 11,461,347 B1* | 10/2022 | Das | G06F 16/2433 |
| 2007/0180115 A1* | 8/2007 | Bahrs | G06F 16/2471 709/226 |
| 2010/0223256 A1* | 9/2010 | Chalana | G06F 16/24539 707/718 |
| 2014/0046928 A1* | 2/2014 | Konik | G06F 16/24542 707/718 |
| 2015/0142846 A1* | 5/2015 | Levine | G06F 16/27 707/769 |
| 2018/0060392 A1* | 3/2018 | Li | G06F 16/951 |
| 2018/0322168 A1 | 11/2018 | Levine et al. | |
| 2020/0183934 A1* | 6/2020 | Mathur | G06F 16/2272 |

\* cited by examiner

*Primary Examiner* — Christopher J Raab
(74) *Attorney, Agent, or Firm* — S. Scott Foster; Kowert, Hood, Munyon, Rankin & Goetzel, P.C.

(57) ABSTRACT

A system to manage database queries including storage devices to implement a data store to store database data and computing devices to implement a query engine. The query engine is configured to receive, from a client, a database query and initiate performance of the query at the data store. The query engine is configured to compare a performance time of the query with a performance time threshold. Based on the performance time exceeding the performance time threshold: send a query identifier for the query and a token indicating that the query has not been completed; and receive, from the client, an additional query comprising the token and the query identifier. Based on a determination that the performance time does not exceed the performance time threshold, send a response to the query to the client, the response comprising data requested by the query.

20 Claims, 11 Drawing Sheets

PAGINATED SYNCHRONOUS DATABASE QUERYING

BACKGROUND

A database service may include computing resources configured to provide databases to clients of a provider network. The database service allows the clients to send queries for data stored at a database. In a multi-tenant database service, many clients may send queries to different databases hosted by the database service. When a client sends a query for requested data, the database service may maintain an active connection to the client until the query is fulfilled, and the requested data is sent back to the client via the active connection.

While the active connection is maintained, the query may be processed by the database service. The active connection may incur operational costs although no data is being actively transferred between the database service and the client while the query is being processed. The client may also repeatedly send queries while the active connection is opened such that the database service has to manage additional queries from the client while the original query is pending fulfillment. The additional queries may cause the database service to perform redundant queries while the client is unaware that the original query is ongoing and yet to be completed by the database service.

Figure 1:
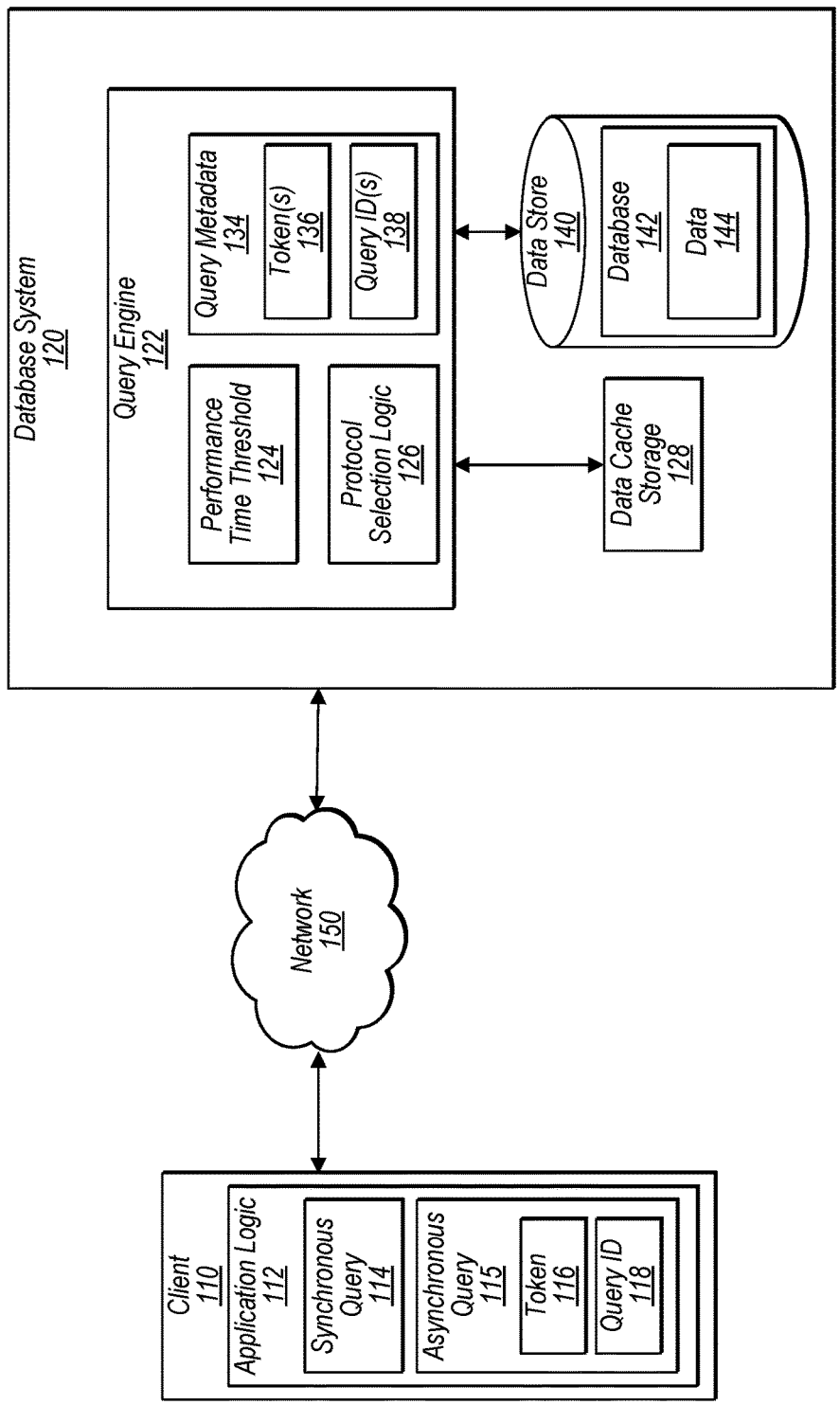
FIG. 1 is a block diagram illustrating a system for paginated synchronous database querying, according to some embodiments.

While embodiments are described herein by way of example for several embodiments and illustrative drawings, those skilled in the art will recognize that the embodiments are not limited to the embodiments or drawings described. It should be understood that the drawings and detailed description thereto are not intended to limit embodiments to the particular form disclosed, but on the contrary, the intention is to cover all modifications, equivalents and alternatives falling within the spirit and scope as defined by the appended claims. As used throughout this application, the word "may" is used in a permissive sense (i.e., meaning having the potential to), rather than the mandatory sense (i.e., meaning must). Similarly, the words "include", "including", and "includes" mean including, but not limited to.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

DETAILED DESCRIPTION

Various embodiments of systems and processes for paginated synchronous database queries are described herein. A provider network may include one or more computing resources configured to provide database services. For example, the computer resources may include one or more storage devices configured to implement data stores configured to store databases on behalf of clients of a multi-tenant service. The computing resources may also implement a query engine configured to manage queries directed to the databases. The computing resources may include computing nodes configured to implement the queries. In some embodiments, the computing nodes maybe organized as computing clusters, such that the computing nodes in respective computing clusters are coordinated to implement the queries assigned to that respective computing cluster.

The query engine may be configured to determine which computing cluster to execute the query based on numerous factors. For example, the query engine may determine which computing cluster to execute the query based on resource utilization of respective computing clusters, projected utilization of the query if run at the respective computing clusters, or configuration requirements for the query. In some situations, the query or a response to the query may be stored in a data page until the response is ready to be sent back to the client that sent the query.

A query may be classified based on a duration of time required to complete execution of the query, in some situations. For example, a threshold duration may result in classification of queries as short queries or long queries depending on whether execution time of the query is less than or greater than the threshold duration. In some embodiments, responses to short queries may be sent back to the client associated with the query, and responses to long queries may be held in data pages or other data storage for subsequent retrieval.

After the query engine initiates execution of the query at the selected computing cluster, the query engine may initiate a loop of actions to manage the query. In some embodiments, the query engine may wait a time period, such as the threshold duration of time that is used to determine whether a query is a short query or a long query. In some implementations, during the wait, the query engine may be configured to block subsequent queries or requests from the client. For example, the query engine may reject subsequent queries from the client to prevent excessive or redundant queries from being processed while the original query is still being executed for the client. After the time period elapses, the query engine may determine whether the query is completed or fulfilled. If the query is completed within the time period, such that the query may be classifiable as a short query, the response to the query may be sent to the client that sent the query. If the query is not yet completed within the time period, such that the query may be classifiable as a long query, the query engine may send information to the client indicating that the query is not yet completed. The information may include a token for pagination and a query identifier for the query. The token and the query identifier may be recorded as metadata for the query.

The query may send an additional query including the token and the query identifier to indicate to the query engine that the additional query is a continuation of the previously sent query. The query engine may continue the loop of actions to manage the query. The loop of actions may be iterated by the query engine by waiting the time period and blocking subsequent queries after the additional query while waiting. The loop of actions may further be iterated by determining whether the query has been completed or fulfilled. If the query has been completed, the response to the query may be sent to the client, and the loop may be terminated. If the query has not been fulfilled, another token and the query identifier may be sent to the client to perform another iteration of the loop. The loop of actions may continue until execution of the query is completed, and the response to the query is sent to the client.

The query engine may also have a size limit for query responses that are sent to clients. For example, the query engine may have limited bandwidth for query responses such that responses are fragmented to multiple portions that have a file size less than or equal to the size limit. The multiple portions may be sent at different points in time separated by a time period, such as the threshold duration of time that is used to determine whether a query is a short query or a long query. Each portion of the multiple portions of the response may be sent sequentially to the client while waiting the time period between each portion. When a final portion of the response to the query is sent to the client, the final portion may include an indication that the response to the query has been completely sent to the client.

In one aspect, a system is described. The system includes one or more storage devices configured to implement a data store to store database data. The system also includes one or more computing devices configured to implement a query engine. The query engine is configured to receive, from a client, a database query. The query engine is also configured to initiate performance of the query at the data store. The query engine is also configured to compare a performance time of the query with a performance time threshold. Based on a determination that the performance time exceeds the performance time threshold, the query engine is configured to send, to the client, a query identifier for the query and a token indicating that the query has not been completed. The query engine may be configured to receive, from the client, an additional query for the data stored at the database, wherein the additional query comprises the token and the query identifier. Based on a determination that the performance time does not exceed the performance time threshold, the query engine may send a response to the query to the client, the response comprising data requested by the query.

In another aspect, a method is described. The method includes receiving a query at a database system from a client. The method also includes initiating performance of the query at the database system. The method further includes selecting, by the database system, a protocol for returning a result of the query based on a performance time of the query at the database system. The method also includes returning, by the database system, the result of the query according to the selected protocol.

In yet another aspect, a one or more computer-readable storage media is described. The one or more computer-readable storage media store instructions that, when executed on or across one or more processors, cause the one or more processors to perform operations. The operations include in response to receiving a query at a database system from a client, initiating performance of the query at the database system. The operations also include selecting, by the database system, a protocol for returning a result of the query based on a performance time of the query at the database system. The operations further include returning, by the database system, the result of the query according to the selected protocol.

FIG. 1 is a block diagram illustrating a system 100 for paginated synchronous database querying, according to some embodiments. The system 100 may include a client 110 and a database system 120, according to some embodiments. The client 110 may be communicatively coupled to the database system 120 via a network 150. In some embodiments, the database system 120 may be implemented as part of a provider network. The database system 120 may include one or more storage devices configured to implement a data store 140, according to some embodiments. The data store 140 may be configured to store one or more databases, such as database 142, according to some embodiments.

The client 110 may include one or more computing devices such as one or more processors and a memory, according to some embodiments. For example, the memory may store instructions that, when executed on or across the one or more processors, cause the one or more processors to implement an application. The application may include application logic 112, according to some embodiments. For example, the application logic 112 may cause the client 110 to perform various tasks in accordance with the instructions stored on the memory. In some embodiments, the application logic 112 may include instructions to generate a synchronous query 114. The client 110 may be configured to send the synchronous query 114 to the database system 120 via the network 150.

The database system 120 may receive the synchronous query 114 to perform a query at database 142 on behalf of the client 110, according to some embodiments. For example, the database system 120 may include a control plane configured to receive the database query 124 from the client 110. In some embodiments, the database system 120 may also be configured to receive the synchronous query 114 in accordance with an API, according to some embodiments. For example, the client 110 may generate the synchronous query 114 to include arguments in accordance with the API and send the synchronous query 114 to the database system 120 via the API, including an indication of the database 142 and an argument indicating data 142 to be retrieved from the database 142.

The database system 120 may be configured to provide a network endpoint for the client 110 to interact with the database system 120, according to some embodiments. For example, the control plane 124 configured to provide the network endpoint to the client 110 in response to a request to establish the database 142. The client 110 may be configured to access the network endpoint to query the database 142, such as by sending the synchronous query 114 via the network endpoint.

A provider network may include one or more computing resources configured to implement services, including database system 120, that are provided to clients, such as the client 110, according to some embodiments. For example, the provider network may be configured to provide services to the clients via the network 150 as a remote or cloud-based service provider. In other embodiments, the provider network may be configured to provide services to clients located within the provider network, such as virtualized computing systems hosted at the provider network via another service.

The database system 120 may include computing resources configured to implement query processing clusters. The query processing clusters may include a plurality of query processing nodes, according to some embodiments. The query processing nodes may designate one of the query processing nodes to function as a query engine 122, according to some embodiments. The query engine 122 may be configured to manage queries to databases, such as the database 142, according to some embodiments. For example, the query engine 122 may manage incoming queries from clients and implement query workers or nodes to query the database 142. In some embodiments, the query engine 122 may be configured to allocate computing resources from the query processing cluster to be configured as a query worker or node to perform at least a portion of a given query. For example, the query engine 122 may request or allocate the computing resources in order to scale processing capability for processing queries to databases at the data store 140.

The client 110 may initiate a connection to the database system 120 by sending the synchronous query 114. In some embodiments, the connection may be held open so long as the client 110 is awaiting a response to the synchronous query 114 from the database system 120. For example, the connection may remain active between a time when the synchronous query 114 is sent to the database system 120 and a time when the database system 120 responds to the synchronous query 114 with the data 144 from the database 142. In some embodiments, the query engine 122 may terminate the connection between the client 110 and the database system 120 to conserve resources. For example, the query engine 122 may be configured to terminate the connection after a period of time, such as performance time threshold 124. In some situations, the query engine 122 maintaining an open connection while idle without active transmission of data would increase operational costs of the provider network. The query engine 122 may reduce operational costs and improve computing resource efficiency by terminating the connection between the client 110 and the database system 120 when a response to the synchronous query 114 is not ready to be sent to the client 110.

The query engine 122 may manage queries by limiting repeated queries by clients while queries are being processed on behalf of the clients, according to some embodiments. For example, the client 110 may send the synchronous query 114 to retrieve the data 144 from the database 142. The query engine 122 may be configured to limit the client 110 from sending asynchronous queries 115 while the synchronous query 114 is being processed by the query workers 123. In some embodiments, the query engine 122 may be configured to limit responsiveness to the asynchronous queries 115 sent by the client 110. For example, the query engine 122 may be configured to block the additional queries or ignore the asynchronous queries 115 as they are sent by the client 110 until the performance time threshold 124 has elapsed.

Protocol selection logic 126 may be configured to classify queries based on execution times for the queries, according to some embodiments. For example, the queries may be classified based on whether the execution time for respective queries satisfy a threshold time period, such as performance time threshold 124. The query engine 122 may cause execution of a query and wait for the performance time threshold 124 to elapse before proceeding, according to some embodiments. For example, the query engine 122 may wait for the performance time threshold 124 then determine whether the execution of the query is complete while rejecting any other incoming queries from the client 110 while waiting. The query engine 122 may determine whether the execution of the query is completed within the performance time threshold 124 in various ways. In some embodiments, the query engine 122 may receive a response to the query from the worker tasked with executing the query to retrieve the data 144 from the database 142, where the response includes the data 144. For example, the query engine 122 may determine that the execution of the query is completed in response to receiving the response to the query from the worker. The response to the query may implicitly or explicitly indicate to the query engine 122 that the query has finished execution by the worker. In some embodiments, the protocol selection logic 126 may classify queries that are completed within one iteration of the performance time threshold 124 as being short queries.

The query engine 122 may include protocol selection logic 126 configured to determine whether the query engine 122 should use a synchronous protocol or an asynchronous protocol to process queries received from the client 110, according to some embodiments. For example, the protocol selection logic 126 may determine whether queries received from the client 110 include information indicating that the queries are primary or secondary queries. As another example, queries may be primary or original queries based on a determination that the queries do not include a token or query identifier that refer to another query.

In situations when the query is not completed within one iteration of the performance time threshold 124, the protocol selection logic 126 may classify the query as a long query. Based on a determination that the query is not completed after the performance time threshold 124 has elapsed, the query engine 122 may be configured to send information to the client 110 indicating that the query has not been completed, according to some embodiments. For example, the query engine 122 may send to the client 110 a token for pagination and a query identifier for the synchronous query 114. In some embodiments, the information sent to the client 110 may indicate that no data responsive to the query 114 is included in the information. In some embodiments, the query engine 122 may store the token and the query identifier as metadata for the synchronous query 114. For example, the query engine 122 may store query metadata 134 for the database query 144 including storing the token as token 136 and the query identifier as query identifier 138. In some embodiments, the query metadata 134 may include metadata for multiple ongoing queries for multiple clients.

In some embodiments, the query engine 122 may close the connection to the client 110 responsive to sending the information to the client 110. For example, the query engine 122 may close or terminate the connection to the client 110 that may have been held open while the query was being executed. The query engine 122 may terminate the connection to the client 110 to reduce computational overhead costs for maintaining an open connection while not transferring the data 144 to the client 110. After the connection is terminated, the client 110 may issue an asynchronous query 115 to the database system 120. For example, the other query may include the token and the query identifier. The token and the query identifier may indicate to the database system 120 that the asynchronous query 115 is a continuation of the synchronous query 114 such that the client 110 has yet to receive a response to the synchronous query 114.

The client 110 may be configured to send asynchronous queries 115 after subsequent connections are terminated until the client 110 receives a response to the synchronous query 114, according to some embodiments. For example, the client 110 may be configured to generate the asynchronous queries 115 based on the database system 120 indicating that the synchronous query 114 has not been completed or fulfilled. In some embodiments, the client 110 may send the asynchronous queries 115 to the database system 120 such that the database system 120 may repeat a similar set of actions as responsive to the synchronous query 114 originally sent by the client 110. For example, the database system 120 may receive an asynchronous query 115 that includes the token as token 116 and the query identifier for the synchronous query 114 as query identifier 118.

The database service may parse the asynchronous queries 115 to identify an original query based on the query metadata 134 for the synchronous query 114, according to some embodiments. For example, the query engine may compare the token 116 and the query identifier 118 against the token 136 and the query identifier 138 stored in the query metadata 134. Based on identifying the original query for the asynchronous queries 115, the query engine 122 may continue to wait for a response for the synchronous query 114.

The query engine 122 may be configured to determine whether a performance time of the query satisfies the performance time threshold 124, according to some embodiments. The query engine 122 may wait for a duration of the performance time threshold 124 and block subsequent queries from the client 110 during the performance time threshold 124, according to some embodiments. After waiting for the performance time threshold 124, the query engine 122 may determine whether the query worker has completed the synchronous query 114. Based on a determination that the query worker 124 has completed the synchronous query 114, the data 144 may be transferred from the database 142 to a destination, according to some embodiments. For example, the query engine 122 may receive the data 144 and send the data 144 to the client 110. As another example, the query engine may receive the data 144 and send the data 144 to a data cache storage 128. In some embodiments, the data cache storage 128 may be configured to store the data 144 for subsequent retrieval by the client 110 in an asynchronous manner with respect to the queries sent by the client 110. For example, the data cache storage 128 may include a cache data store configured to store data on behalf of the client 110 as retrieved from the database 142, where the data cache storage 128 has a different retention policy compared to the database 142.

The data cache storage 128 may be configured to store the data 144 in a plurality of pages to allow individual pages to be sent to the client 110 in accordance with a transfer size limit. For example, respective sizes may be less than or equal to the transfer size limit. In other embodiments, data stored in the data cache storage 128 may be transferred to the client 110 in transmission configured to not exceed the transfer size limit.

Based on a determination that the query worker has not completed the synchronous query 114, the query engine 122 may send a new token and the query identifier 138 to the client 110 to indicate that the synchronous query 114 is still not yet completed, according to some embodiments. For example, the query engine 122 may generate the new token based on the token 136, such as by incrementing a counter for the token 136. As another example, the token 136 may be resent to the client 110 without any modifications. If the new token is generated and is different from the token 136 previously sent to the client 110, the new token may be stored as the token 136 in the query metadata 134. The client 110 may send asynchronous queries 115, and the query engine 122 may repeat the process until the query worker has completed the synchronous query 114 to retrieve the data 144 from the database 142, according to some embodiments.

Figure 2:
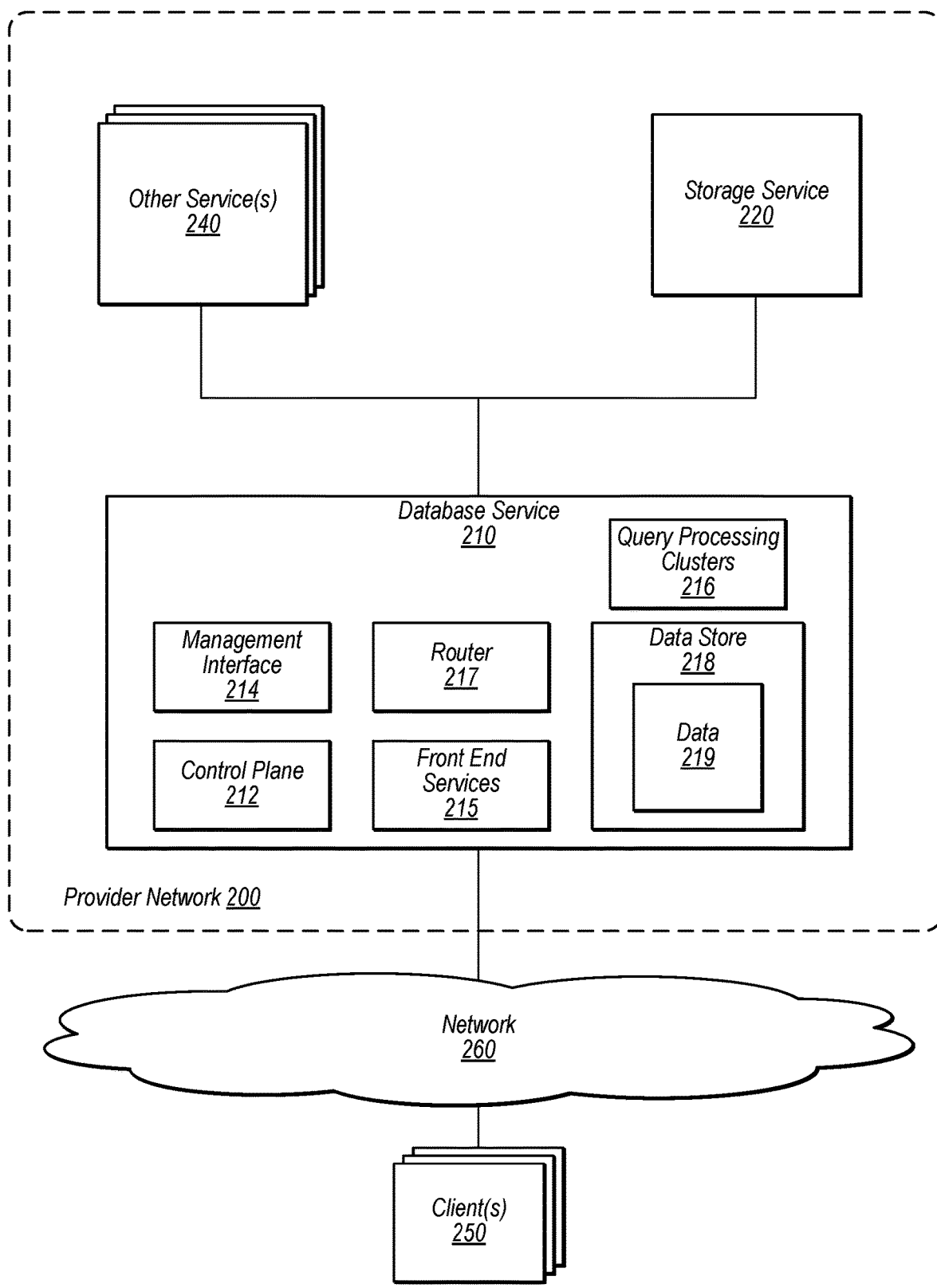
FIG. 2 is a block diagram of provider network for a managed database as a service, according to some embodiments.

FIG. 2 is a block diagram of provider network 200 for a managed database as a service, according to some embodiments. The provider network 200 may be configured to provide various services to clients 250 via a network 260, according to some embodiments. The provider network 200 may include database service 210 configured to provide computing services. The provider network 200 may also include a storage service 220, and other services 240, according to some embodiments.

The provider network 200 can be formed as a number of regions, where a region is a separate geographical area in which the cloud provider clusters data centers. Each region can include two or more availability zones connected to one another via a private high-speed network, for example a fiber communication connection. An availability zone (also known as an availability domain, or simply a "zone") refers to an isolated failure domain including one or more data center facilities with separate power, separate networking, and separate cooling from those in another availability zone. Preferably, availability zones within a region are positioned far enough away from one other that the same natural disaster should not take more than one availability zone offline at the same time. Customers can connect to availability zones of the provider network 200 via a publicly accessible network (e.g., the Internet, a cellular communication network), such as the network 260. Regions are connected to a global network which includes private networking infrastructure (e.g., fiber connections controlled by the cloud provider) connecting each region to at least one other region. The provider network 200 may deliver content from points of presence outside of, but networked with, these regions by way of edge locations and regional edge cache servers. An edge location can be an extension of the cloud provider network outside of the traditional region/AZ context. For example, an edge location can be a data center positioned to provide capacity to a set of customers within a certain latency requirement, a set of servers provided to a customer's premises, or a set of servers provided within (or forming part of) a cellular communications network, each of which can be controlled at least in part by the control plane of a nearby AZ or region. This compartmentalization and geographic distribution of computing hardware enables the provider network 200 to provide low-latency resource access to customers on a global scale with a high degree of fault tolerance and stability.

The traffic and operations of the cloud provider network may broadly be subdivided into two categories in various embodiments: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, system state information). The data plane includes customer resources that are implemented on the cloud provider network (e.g., computing instances, containers, block storage volumes, databases, file storage). Data plane traffic generally includes non-administrative operations such as transferring customer data to and from the customer resources. Certain control plane components (e.g., tier one control plane components such as the control plane for a virtualized computing service) are typically implemented on a separate set of servers from the data plane servers, while other control plane components (e.g., tier two control plane components such as analytics services) may share the virtualized servers with the data plane, and control plane traffic and data plane traffic may be sent over separate/distinct networks.

As noted above, provider network 200 may implement various computing resources or services, such as a database service 210, a block-based storage service 220, and other service(s) 240 which may be any other type of network based services, including various other types of storage (e.g., database service or an object storage service), data processing, analysis, communication, event handling, visualization, and security services not illustrated).

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system embodiment illustrated in FIG. 11 and described below. In various embodiments, the functionality of a given system or service component (e.g., a component of data storage service 220) may be implemented by a particular node or may be distributed across several nodes. In some embodiments, a given node may implement the functionality of more than one service system component (e.g., more than one data store component).

Database service 210 may offer database resources according to various configurations for client 250 operation. For example, the database service 210 may include query processing clusters 216 configured to manage queries for data store 218 to retrieve or modify data 219. Management interface 214 may implement the workflows, tasks, or other operations to handle database requests, including, but not limited to establishing databases, disabling databases, or modifying databases.

Database service 210 may implement control plane 212, which may include various features to manage the Database service 210 on behalf of client(s) 250, in some embodiments. For example, control plane 212 may implement various interfaces that transmit information on behalf of the clients 250. Control plane 212 may also implement the management interface 214, which may support various operations to configure or enable features, deploy, start, stop, pause, resume, or other controls for the database service 210. Control plane 212 may also support various features related to implementing databases as a service.

Database service 210 may also include front end services 215 configured to provide client-facing services for interacting with the database service 210. Database service 210 may include router 217 configured to direct client queries to the query processing clusters 216 for obtaining data 219 from the data store 218.

Interfaces may include various types of interfaces, such as a command line interface, graphical user interface, and/or programmatic interface (e.g., Application Programming Interfaces (APIs)) in order to perform requested operations. An API refers to an interface and/or communication protocol between a client and a server, such that if the client makes a request in a predefined format, the client should receive a response in a specific format or initiate a defined action. In the cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another.

Provider network 200 may also implement block-based storage service 230, in various embodiments, for performing storage operations. Block-based storage service 230 may be a storage system that provides block level storage for storing one or more sets of data volumes of data that may be mapped to particular clients (e.g., a virtual compute instance of virtual compute service 210), providing virtual block-based storage (e.g., hard disk storage or other persistent storage) as a contiguous set of logical blocks. In some embodiments, block-based storage service 230 may store data in a data store.

Generally speaking, clients 250 may encompass any type of client configurable to submit network-based requests to provider network 200 via network 260, including requests for storage services (e.g., a request to create a replication job in migration service 230, etc.). For example, a given client 250 may include a suitable version of a web browser or may include a plug-in module or other type of code module that may execute as an extension to or within an execution environment provided by a web browser. Alternatively, a client 250 may encompass an application (or user interface thereof), a media application, an office application or any other application that may make use of resources in provider network 200 to implement various applications. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 250 may be an application may interact directly with provider network 200. In some embodiments, client 250 may generate network-based services requests according to a Representational State Transfer (REST)-style network-based services architecture, a document- or message-based network-based services architecture, or another suitable network-based services architecture.

In some embodiments, a client 250 may provide access to provider network 200 to other applications in a manner that is transparent to those applications. For example, client 250 may integrate with an operating system or file system to provide storage on a data storage service (e.g., a block-based storage service 230). However, the operating system or file system may present a different storage interface to applications, such as a conventional file system hierarchy of files, directories and/or folders. In such an embodiment, applications may not need to be modified to make use of the storage system service model. Instead, the details of interfacing to the data storage service may be coordinated by client 250 and the operating system or file system on behalf of applications executing within the operating system environment.

Clients 250 may convey network-based services requests to and receive responses from provider network 200 via network 260. In various embodiments, network 260 may encompass any suitable combination of networking hardware and protocols necessary to establish network-based-based communications between clients 250, user devices 252 and provider network 200. For example, network 260 may generally encompass the various telecommunications networks and service providers that collectively implement the Internet. Network 260 may also include private networks such as local area networks (LANs) or wide area networks (WANs) as well as public or private wireless networks. For example, both a given client 250 and provider network 260 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 250 and the Internet as well as between the Internet and provider network 200. It is noted that in some embodiments, clients 250 may communicate with provider network 200 using a private network rather than the public Internet.

In some embodiments, provider network 200 may include the hardware (e.g., modems, routers, switches, load balancers, proxy servers, etc.) and software (e.g., protocol stacks, accounting software, firewall/security software, etc.) necessary to establish a networking links between different components of provider network 200, such as virtualization hosts, control plane components as well as external networks 260 (e.g., the Internet). In some embodiments, provider network 200 may employ an Internet Protocol (IP) tunneling technology to provide an overlay network via which encapsulated packets may be passed through the internal network using tunnels. The IP tunneling technology may provide a mapping and encapsulating system for creating an overlay network and may provide a separate namespace for the overlay layer and the internal network layer. Packets in the overlay layer may be checked against a mapping directory to determine what their tunnel target should be. The IP tunneling technology provides a virtual network topology; the interfaces that are presented to clients 250 may be attached to the overlay network so that when a client 250 provides an IP address that they want to send packets to, the IP address is run in virtual space by communicating with a mapping service that knows where the IP overlay addresses are.

Figure 3:
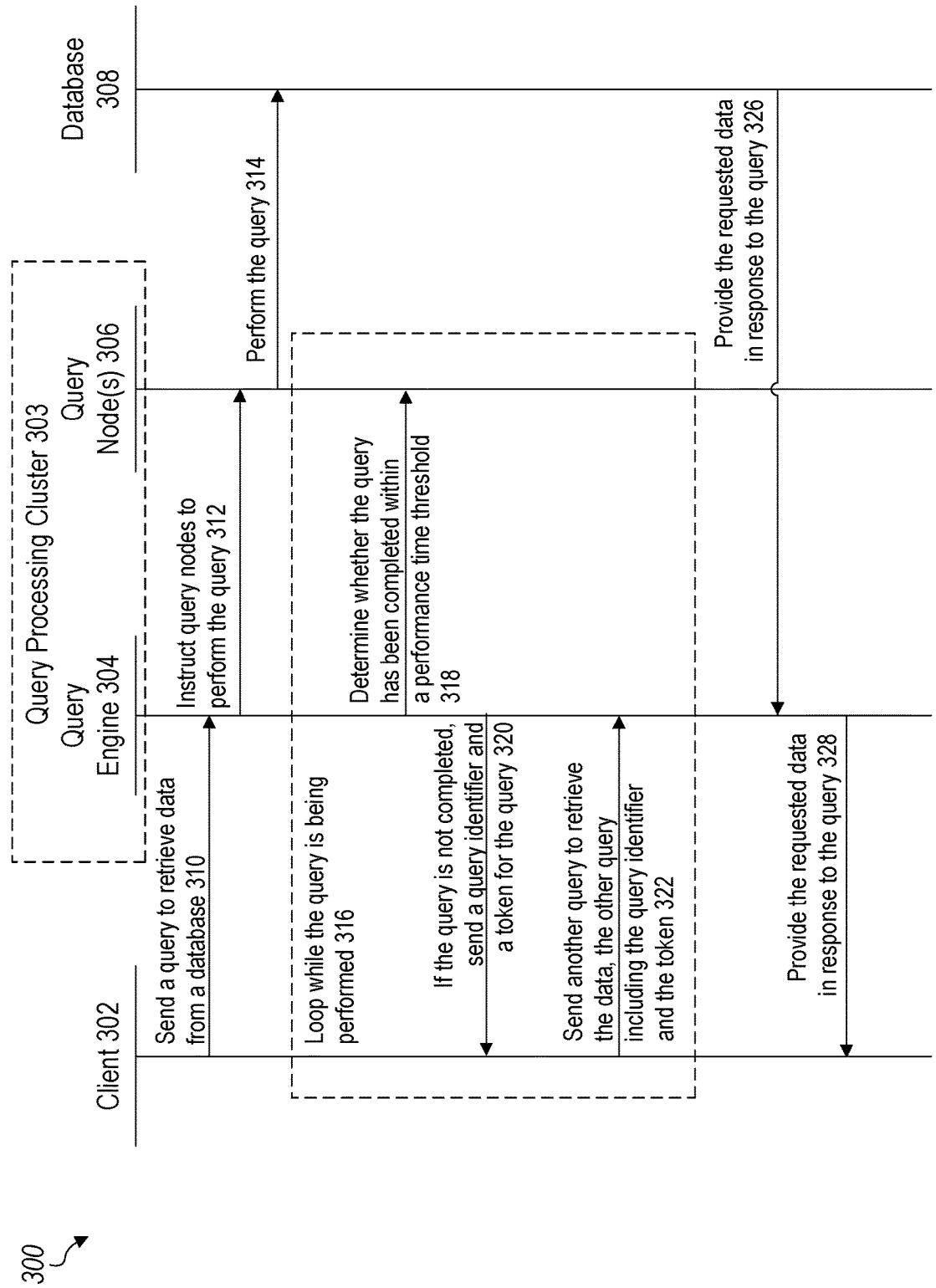
FIG. 3 is a timeline diagram illustrating a data flow between a client and a database service, according to some embodiments.

FIG. 3 is a timeline diagram illustrating a data flow 300 between a client and a database service, according to some embodiments. The database service may be implemented as part of a provider network, such as the provider network of FIG. 1. The database service may correspond to the database system 120 of FIG. 1. Client 302 may correspond to the client 110 of FIG. 1, according to some embodiments. Query processing cluster 303 may include query engine 304 and query node(s) 306, according to some embodiments. Query engine 304 may correspond to the query engine 122 of FIG. 1, according to some embodiments. Database 308 may correspond to the database 142 of FIG. 1, according to some embodiments.

The client 302 may be configured to send, to a query engine 304 of a database service, a query to retrieve data from database 308, at 310. The query may correspond to the synchronous query 114 of FIG. 1, according to some embodiments. The query may indicate a type of data to retrieve from the database 308, according to some embodiments.

The query engine 304 may instantiate the query nodes 306 to perform the query, at 312. In some embodiments, the query engine 304 may cause deployment of the query nodes 306. For example, the query nodes 306 may be deployed from a pool of nodes of the provider network. In some embodiments, the query engine 304 may send information indicating the query to the query nodes 306. For example, the query engine 304 may provide an indication of the requested data and the database from which the query nodes 306 are to obtain the requested data.

The query nodes 306 may perform the query, at 314. The query nodes 306 may be configured to execute the query responsive to instantiation by the query engine 304, according to some embodiments. The query may be performed over a period of time such that other aspects of the database service may be configured to perform additional actions while the query is being performed.

While the query is being performed by the query nodes 306, the client 302 and the query engine 304 may continue to iteratively loop asynchronously relative to the query nodes 306, at 316. The query engine 304 may be configured to determine whether the query has been completed at the query nodes 306 within a performance time threshold, at 318. In some embodiments, the performance time threshold may correspond to the performance time threshold 124 of FIG. 1. The performance time threshold may be a threshold time period may be compared against execution times of queries to determine whether the queries are classifiable as short queries or long queries. In some embodiments, while the query engine 304 is waiting for the performance time threshold to elapse, the query engine 304 may be configured to reject or block subsequent query attempts from the client 302. For example, the query engine 304 may ignore or affirmatively decline the subsequent query attempts until the performance time threshold has elapsed.

The query engine 304 may be configured to determine whether the query has been completed at the query nodes 306, at 318. In some embodiments, the query engine 304 may be configured to determine whether the query node 306 has been completed based on receiving a response from the query nodes 306 indicating the results of the query. In other embodiments, the query engine 304 may be configured to poll the query node 306 to determine whether the query has been completed. In yet other embodiments, the query engine 304 may be configured to analyze metadata for the query nodes 306 to identify a flag that indicates that the query has been completed.

Based on a determination that the query is not completed, the query engine 304 may send a query token and a token for the query to the client 302, at 320. In some embodiments, the query identifier may be used by the query engine 304 to identify the query originally sent by the client 302. For example, the query engine 304 may be configured to identify ongoing queries according to query identifiers provided by the client 302. In some embodiments, the query engine 304 may be configured to record the query identifier and the token as metadata for the query. For example, the query engine 304 may be configured to store metadata for queries sent by clients to track long queries that have not yet been completed by respective ones of the query nodes 306. In some embodiments, the query engine 304 may be configured to terminate the connection between the client 302 and the query engine 304 after sending the query identifier and the token to the client 302. For example, the query engine 304 may reduce operational overhead costs by terminating the connection while the query is not yet completed by the query nodes 306 to mitigate having the connection remain open while no data resulting from the query is being transmitted to the client 302. In some embodiments, the token may be incremented for each iteration of the process. For example, the token may be incremented for every other token that has been sent to the client 302 relating to the query sent at 310.

The client 302 may be configured to send another query to retrieve the data, where the other query includes the query identifier and the token, at 322. The other query may correspond to the asynchronous query 115 of FIG. 1, according to some embodiments. In some embodiments, the client 302 may send the other query after termination of the connection by the query engine 304. For example, the query engine 304 may terminate the connection to conserve bandwidth or connection resources, and the client 302 may reestablish the connection at a later time to attempt to obtain the data requested in the query.

While the query is being performed by the query nodes 306, the process may return to 316 to continue another iteration of the loop until the query has been completed by the query nodes 306. In some embodiments, the process may be iterated repeatedly until the query has been completed.

Based on a determination that the query has been completed, the process may proceed to 324, according to some embodiments. The database 308 may provide the requested data in response to the query, at 324. In some embodiments, the database 308 provide the requested data to the query nodes 306 for subsequent transmission to the query engine 304. For example, the query nodes 306 may receive the requested data and subsequently send the requested data to the query engine 304. In other embodiments, the database 308 may send the requested data to the query engine 304 directly through an interface configured between the query engine 304 and the database 308.

The query engine 304 may provide the requested data in response to the query, at 326. In some embodiments, the query engine 304 may send the requested data after the pre-determined time period elapses, at 316, and a determination that the query has been completed, at 318. For example, the query engine 304 may send the requested data as part of an iteration of the process for performance of the query. In some embodiments, the query engine 304 may send the requested data in response to the query originally sent at 310 or any other query sent at 322. For example, the requested data may be provided as a response to any query sent by the client relating to the original query at 310. In some embodiments, the query engine 304 may send the requested data to a data cache service to be stored for a period of time. For example, the client 302 may be configured to retrieve the requested data from the data cache service based on information provided by the query engine 304, such as endpoint information or other connection information.

Figure 4:
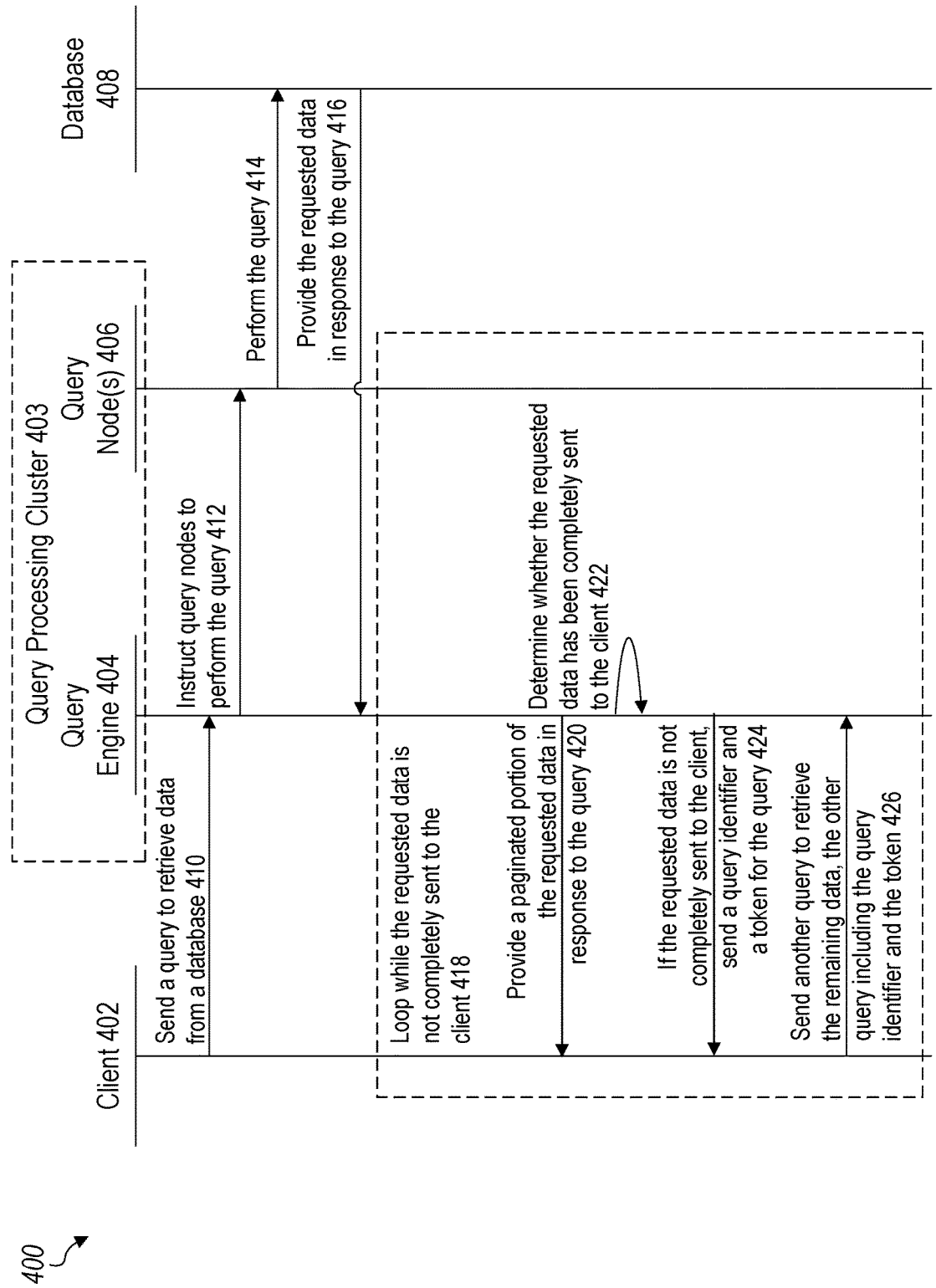
FIG. 4 is a timeline diagram illustrating a data flow between a client and a database service, according to some embodiments.

FIG. 4 is a timeline diagram illustrating a data flow 400 between a client and a database service, according to some embodiments. The database service may be implemented as part of a provider network, such as the provider network of FIG. 1. The database service may correspond to the database system 120 of FIG. 1. Client 402 may correspond to the client 110 of FIG. 1 or the client 302 of FIG. 3, according to some embodiments. Query processing cluster 403 may include query engine 404 and query node(s) 406, according to some embodiments. Query engine 404 may correspond to the query engine 122 of FIG. 1 or the query engine 304 of FIG. 3, according to some embodiments. Query node(s) 406 may correspond to the query node(s) 306 of FIG. 3, according to some embodiments. Database 408 may correspond to the database 142 of FIG. 1 or the database 308 of FIG. 3, according to some embodiments.

The client 402 may be configured to send, to a query engine 404 of a database service, a query to retrieve data from database 408, at 410. The query may correspond to the synchronous query 114 of FIG. 1, according to some embodiments. The query may indicate a type of data to retrieve from the database 408, according to some embodiments.

The query engine 404 may instantiate the query nodes 406 to perform the query, at 412. In some embodiments, the query engine 404 may cause deployment of the query nodes 406. For example, the query nodes 406 may be deployed from a pool of nodes of the provider network. In some embodiments, the query engine 404 may send information indicating the query to the query nodes 406. For example, the query engine 404 may provide an indication of the requested data and the database from which the query nodes 406 are to obtain the requested data.

The query nodes 406 may perform the query, at 414. The query nodes 406 may be configured to execute the query responsive to instantiation by the query engine 404, according to some embodiments. The query may be performed over a period of time such that other aspects of the database service may be configured to perform additional actions while the query is being performed.

The database 408 may provide the requested data in response to the query, at 416. In some embodiments, the database 408 provide the requested data to the query nodes 406 for subsequent transmission to the query engine 404. For example, the query nodes 406 may receive the requested data and subsequently send the requested data to the query engine 404. In other embodiments, the database 408 may send the requested data to the query engine 404 directly through an interface configured between the query engine 404 and the database 408.

The data flow 400 may include performing a loop while the requested has not been completely sent to the client, at 418. The query engine 404 may be configured to provide a paginated portion of the requested data in response to the query, at 420. Pagination may refer to partitioning or segmenting the requested data into portions that are less than or equal to a transfer size limit. In some embodiments, the query engine 404 may be subject to a transfer size limit for data sent by the query engine 404 to the client 402. For example, the query engine 404 may limit outgoing data transmissions to reduce or spread-out bandwidth consumption such that a size of the paginated portion does not exceed the transfer size limit. In some embodiments, the query engine 404 may set the transfer size limit based on utilization statistics or historical data for the database service. In some embodiments, the query engine 404 may set the transfer size limit based on a service level agreement between the database service and the client 402. In various embodiments, the wait at 402 may occur before or after providing the paginated portion to the client 402, at 422. For example, the query engine 404 may first provide the paginated portion, at 422, then wait for the performance time threshold to elapse, at 422. As an alternative example, the query engine 404 may first wait for the performance time threshold to elapse, at 422, then provide the paginated portion of the requested data, at 422.

The query engine 404 may be configured to determine whether the requested data has been completely sent to the client 402, at 422. In some embodiments, the query engine 404 may be configured to track a quantity of the requested data that has been sent to the client 402. For example, the query engine 404 may be configured to record metadata for the query and the requested data. In some embodiments, the metadata may include a query identifier for the query and a token that indicates that the requested data has not been completely sent to the client 402. For example, the query identifier may identify the query to the query engine 404 such that when the query identifier is provided as part of a subsequent query, the query engine 404 may resume the loop 418 as relating to the query. As another example, the token may indicate a quantity of data that has already been sent to the client 402. In some embodiments, the token may include information that identifies the quantity of data that has been sent to the client 402. For example, the query engine 404 may analyze the token to determine a remaining quantity of the requested data to send to the client 402.

If the requested data has not been completely sent to the client 402, the query engine 404 may be configured to send the query identifier and the token for the query to the client 402, at 424. In some embodiments, the token may be incremented each time the query engine 404 sends a portion of the requested data while unsent portions of the requested data remain. For example, the query engine 404 may increment the token for each iteration of the loop 418. In some embodiments, the paginated portion of the requested data may be sent with the query identifier and the token as a consolidated response to the query.

The client 402 may be configured to send another query to retrieve the remaining data from the query engine 404, where the other query includes the query identifier and the token, at 426. In some embodiments, the client 402 may determine that the requested data has not been completely sent to the client 402 based on the presence of the token. For example, the client 402 may be configured to infer that remaining portions of the requested data are at the query engine 404 based on the token being sent to the client 402.

Figure 5:
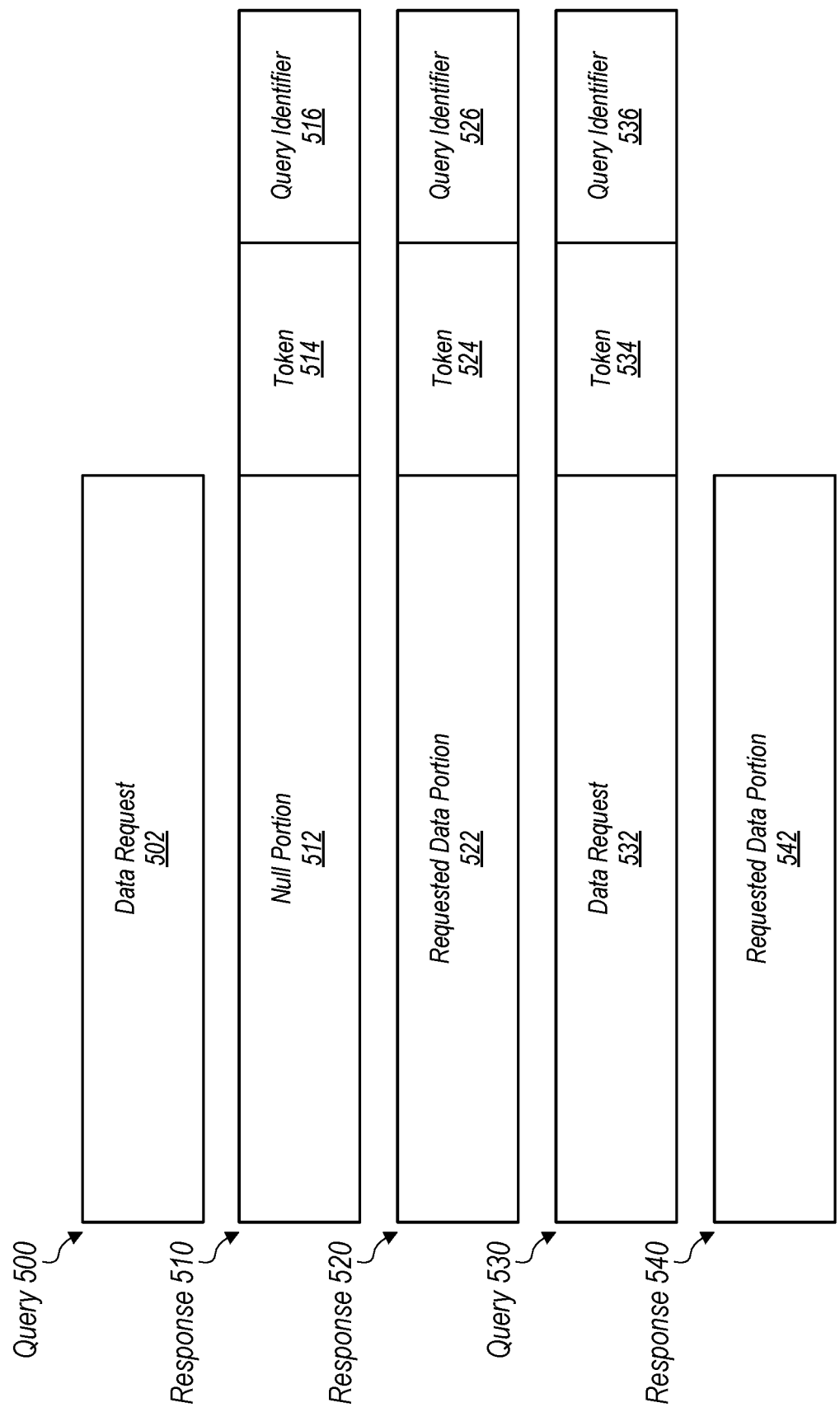
FIG. 5 is a block diagram illustrating logical representations of queries and responses to queries, according to some embodiments.

FIG. 5 is a block diagram illustrating logical representations of queries and responses to queries, according to some embodiments. The depicted queries and responses are for illustrative purposes and may be expressed in a computer-readable manner, such as an extensible markup language (XML).

Query 500 may be generated by a client, such as the client 110 of FIG. 1, the clients 250 of FIG. 2, the client 302 of FIG. 3, or the client 402 of FIG. 4, according to some embodiments. The client may be configured to generate the query 500 to request data from a database. For example, the query 500 may include a data request 502 that identifies data or a data type to be retrieved from the database. In some embodiments, the client may send the query 500 to a database service, such as the database system 120 of FIG. 1, the database service 210 of FIG. 2, the database 308 of FIG. 3, or the database 408 of FIG. 4. In some embodiments, the query 500 may be an original query to request the data indicated by the data request 502. For example, an original query for data may not necessarily include a token or query identifier that would indicate to the database service that the query 500 is a continuation of a previously sent query.

In situations when the database service has not completed execution of the query 500, the database service may generate a response 510 to the query 500, according to some embodiments. For example, the database service may include a query engine configured to manage queries, including the query 500. The query engine may determine that execution of the query 500 is incomplete and generate a token and a query identifier for the query 500. The token may indicate to the client and the database service that the query 500 has not been completed by the database service. The response 510 may be sent to the client in response to the query 500 after a waiting period causing the database service to issue the response 510.

In situations when the database service has completed execution of the query 500, the database service may generate a response 520 to the query 500, according to some embodiments. The database service may have the requested data to be sent to the client prepared for transmission subject to a transfer size limit, according to some embodiments. For example, the database service may have a limited amount of bandwidth such that outgoing transmissions are limited to the transfer size limit. The response 520 may include a requested data portion 522, a token 524, and a query identifier 526 for the query 500. The token 524 may indicate that the requested data included in the requested data portion 522 is not complete with respect to the data request 502 of the query 500. The token 524 may be incremented or modified to indicate how many portions have been transferred to the client or how many portions remain to be sent to the client.

The client may be configured to generate an additional query 530 that includes a data request 532, a token 534, and a query identifier 536 associated with the query 500, according to some embodiments. The additional query 530 may be sent by the client to the database service in response to the response 510 or the response 520 being received by the client. The data request 532 may correspond to the data request 502 to maintain consistency between the query 500 and the additional query 530.

The database service may generate a response 540 to the query 500 based on a determination that the requested data portion 542 is all of the requested data for the query 500. As another example, the response 540 may be generated based on a determination that the requested data portion 542 is a final portion of the requested data that has been paginated or fragmented in accordance with the transfer size limit. The client may determine that the requested data portion 542 is intended to be the final response to the query 500 based on a lack of a token or a query identifier in the response 540.

Figure 6:
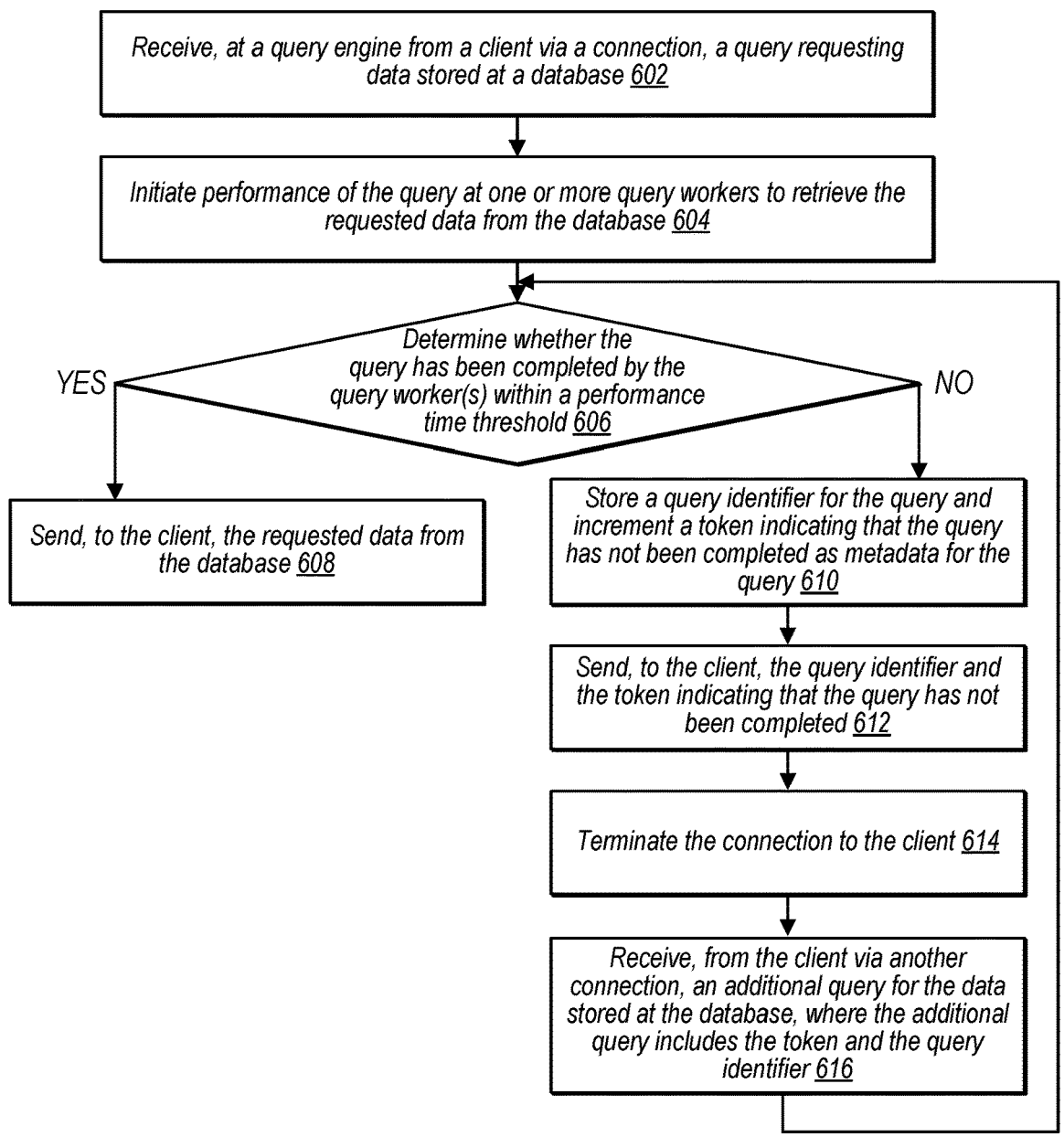
FIG. 6 is a flowchart diagram for a method for managing queries for a database, according to some embodiments.

FIG. 6 is a flowchart diagram for a method 600 for managing queries for a database, according to some embodiments. The method 600 may be performed by a query engine for a database service. The query engine may correspond to the query engine 122 of FIG. 1, the query processing clusters 216 of FIG. 2, the query engine 304 of FIG. 3, or the query engine 404 of FIG. 4, according to some embodiments.

The method 600 may include receiving, at the query engine from a client via a connection, a query requesting data stored at a database, at 602. The query may correspond to the synchronous query 114 of FIG. 1 or the query 400 of FIG. 4, according to some embodiments. The database may correspond to the database 142 of FIG. 1, the database 208 of FIG. 2, the database 308 of FIG. 3, or the data store 518 of FIG. 5, according to some embodiments.

The method 600 may include initiating performance of the query at one or more query workers to retrieve the requested data from the database, at 604. The query workers may correspond to the query workers 123 of FIG. 1, the query nodes 206 of FIG. 2, the query nodes 306 of FIG. 3, or the query workers 517 of FIG. 5, according to some embodiments. In some embodiments, the query engine may deploy, instantiate, or provision one or more computing devices or computing nodes to implement the query workers. For example, the query engine may obtain, lease, or acquire the computing devices to be configured to implement one or more tasks relating to performing a query at a database.

The method 600 may include determining whether the query has been completed by the query worker(s) within a performance time threshold, at 606. The performance time threshold may correspond to the performance time threshold 124 of FIG. 1, according to some embodiments. In some embodiments, the performance time threshold may correspond to a duration of time that may be used to determine whether a query is considered a short or fast query versus a long query. For example, a query that is not completed by the time the performance time threshold elapses may be considered a long query, and a query that is completed by the time the performance time threshold elapses may be considered a short or fast query. In other embodiments, the pre-determined time period may represent a delay to pace or defer query responses to mitigate overloading of the computing resources used to implement the query engine or the query workers.

In some embodiments, the query engine may be configured to determine whether the query has been completed within the performance time threshold based on receiving the requested data from the query workers. In other embodiments, the query engine may be configured to determine whether the query has been completed performance time threshold based on the query workers storing information indicating that the query has been completed. In yet other embodiments, the query engine may be configured to determine whether the query has been completed performance time threshold based on polling the query workers.

The query engine may determine whether to apply a synchronous query protocol or an asynchronous query protocol based on whether the query has been completed within the performance time threshold, according to some embodiments. For example, a synchronous query may result in a response prior to the performance time threshold elapsing. As another example, an asynchronous query may require one or more additional iterations to retrieve the requested data from the database.

Based on a determination that the query has been completed by the query worker(s) within the performance time threshold, the method 600 may include sending, to the client, the requested data from the database, at 608. In some embodiments, the query engine may be configured to send a response to the query. The response may correspond to the response 540, according to some embodiments. In some embodiments, the query worker may provide the requested data to the query engine to be sent to the client. In other embodiments, the query worker may be directed by the query engine to send the requested data to the client. In yet other embodiments, the query engine may store the requested data in temporary storage to be obtained by the client. For example, the query engine may store the requested data in a data cache and provide the client with information on how to access the data cache to retrieve the requested data.

Based on a determination that the query has not been completed by the query worker(s) within the performance time threshold, the method 600 may include storing a query identifier for the query and incrementing a token indicating that the query has not been completed as metadata for the query, at 610. In some embodiments, the query engine may be configured to maintain the metadata for queries sent to the query engine that are considered long queries that require more time to complete than the performance time threshold. The token may indicate a quantity of iterations that the performance time threshold was met while performing the query.

The method 600 may include sending, to the client, the query identifier and the token indicating that the query has not been completed, at 612. In some embodiments, the query engine may send a response to the query that includes the query identifier and the token. The response may correspond to the response 510 of FIG. 5, according to some embodiments. For example, the response may comprise a null portion reserved for the requested data, the query identifier, and the token.

The method 600 may include terminating the connection to the client, at 614. In some embodiments, the query engine may preserve bandwidth or computing resources by terminating the connection between the database service and the client. For example, the connection may incur operational costs by remaining open without an active data transfer between the client and the database service.

The method 600 may include receiving, from the client via another connection, an additional query for the data stored at the database, where the additional query includes the token and the query identifier, at 616. The additional query may correspond to the asynchronous query 115 of FIG. 1. In some embodiments, the client may establish another connection for the additional query. For example, the terminated connection at 614 may require that the client reconnect or establish a new connection to the database service. The additional query may include the token and the query identifier that was supplied by the query engine at 612. The method 600 may return to 606 to again determine whether the query has been completed by the query worker(s) with a performance time threshold since the additional query was received from the client.

Figure 7:
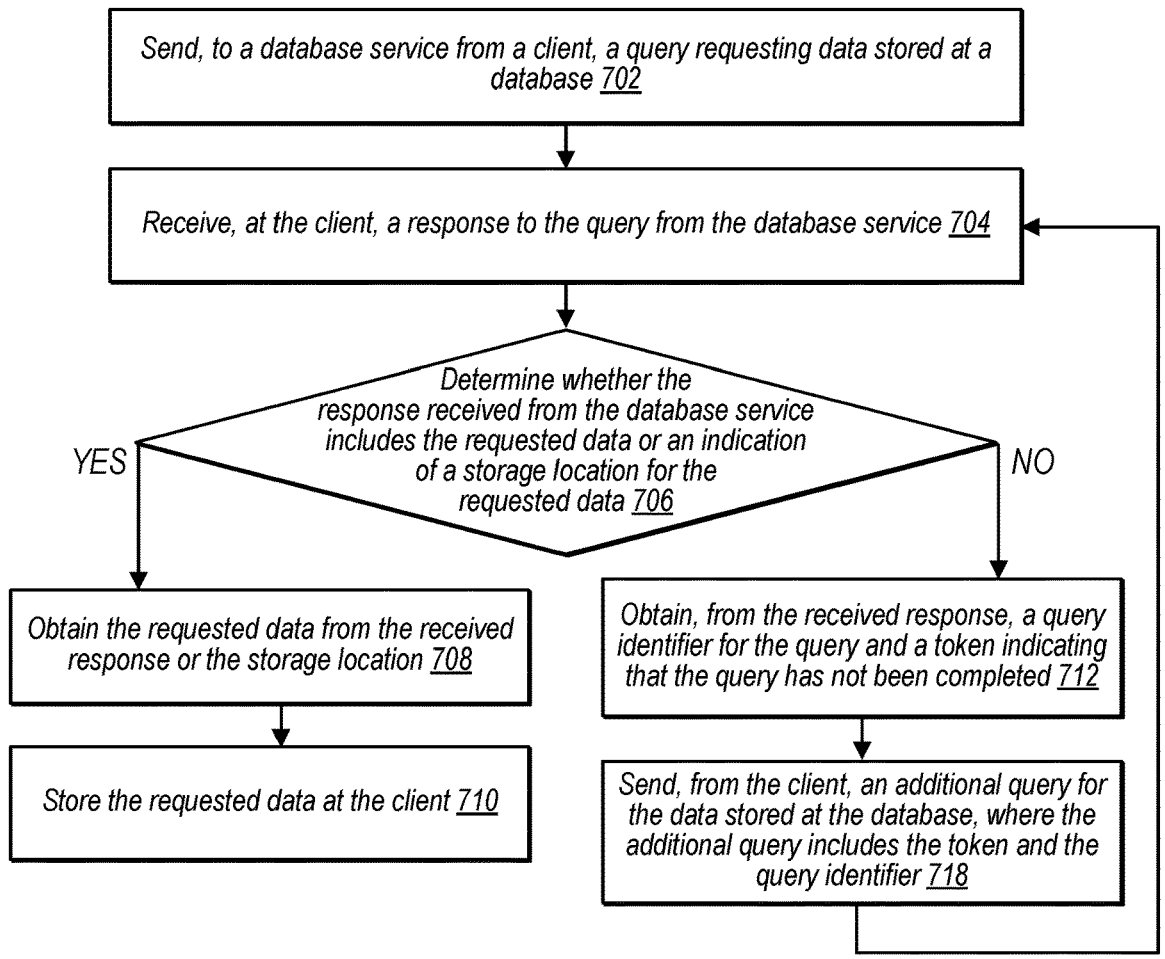
FIG. 7 illustrates a flowchart diagram for a method for a client sending queries requesting data from a database, according to some embodiments.

FIG. 7 illustrates a flowchart diagram for a method 700 for a client sending queries requesting data from a database. The client may correspond to the client 110 of FIG. 1, the clients 250 of FIG. 2, the client 302 of FIG. 3, or the client 402 of FIG. 4, according to some embodiments. In some embodiments, the method 700 may be performed by the client as a counterpart to the method 600 being performed by the query engine.

The method 700 may include sending, to a database service from a client, a query requesting data stored at a database, at 702. The database service may correspond to the database system 120 of FIG. 1, the database service 210 of FIG. 2, the database 308 of FIG. 3, or the database 408 of FIG. 4, according to some embodiments. The query may correspond to the synchronous query 114 of FIG. 1 or the query 400 of FIG. 4, according to some embodiments. The database may correspond to the database 142 of FIG. 1, the database 208 of FIG. 2, the database 308 of FIG. 3, or the data store 518 of FIG. 5, according to some embodiments.

The method 700 may include receiving, at the client, a response to the query from the database service, at 704. The response may correspond to the response 510 or the response 540 of FIG. 5, according to some embodiments. In some embodiments, the response to the query may be generated by a query engine of the database service. For example, the response to the query may be generated as described with respect to 608 or 612 of FIG. 6.

The method 700 may include determining whether the response received from the database service includes the requested data or an indication of a storage location for the requested data, at 706. In some embodiments, the client may analyze the response to determine if the response includes a null portion or a requested data portion. For example, the client may determine whether any data from the requested data of the query is included in the received response. In some situations, the requested data portion of the response may include an indication of a storage location, such as a network endpoint or resource address to obtain the requested data. For example, the requested data may be stored in at a storage service configured to cache the requested data until the client has had the opportunity to retrieve the requested data.

Based on a determination that the received response includes the requested data or an indication of a storage location for the requested data, the method 700 may include obtaining the requested data from the received response or the storage location, at 708. The method 700 may conclude by storing the requested data at the client, at 710.

Based on a determination that the received response does not include the requested data or an indication of a storage location for the requested data, the method 700 may include obtaining, from the received response, a query identifier for the query and a token indicating that the query has not been completed, at 712. In situations when the received response does not include the requested data, the received response may include the query identifier and the token provided by the database service.

The method 700 may include sending, from the client, an additional query for the data stored at the database, where the additional query includes the token and the query identifier, at 718. The additional query may correspond to the asynchronous query 115 of FIG. 1, according to some embodiments. The additional query may include the token and the query identifier that was supplied by the query engine at 612. The method 700 may return to 704 to receive another response to the additional query.

Figure 8:
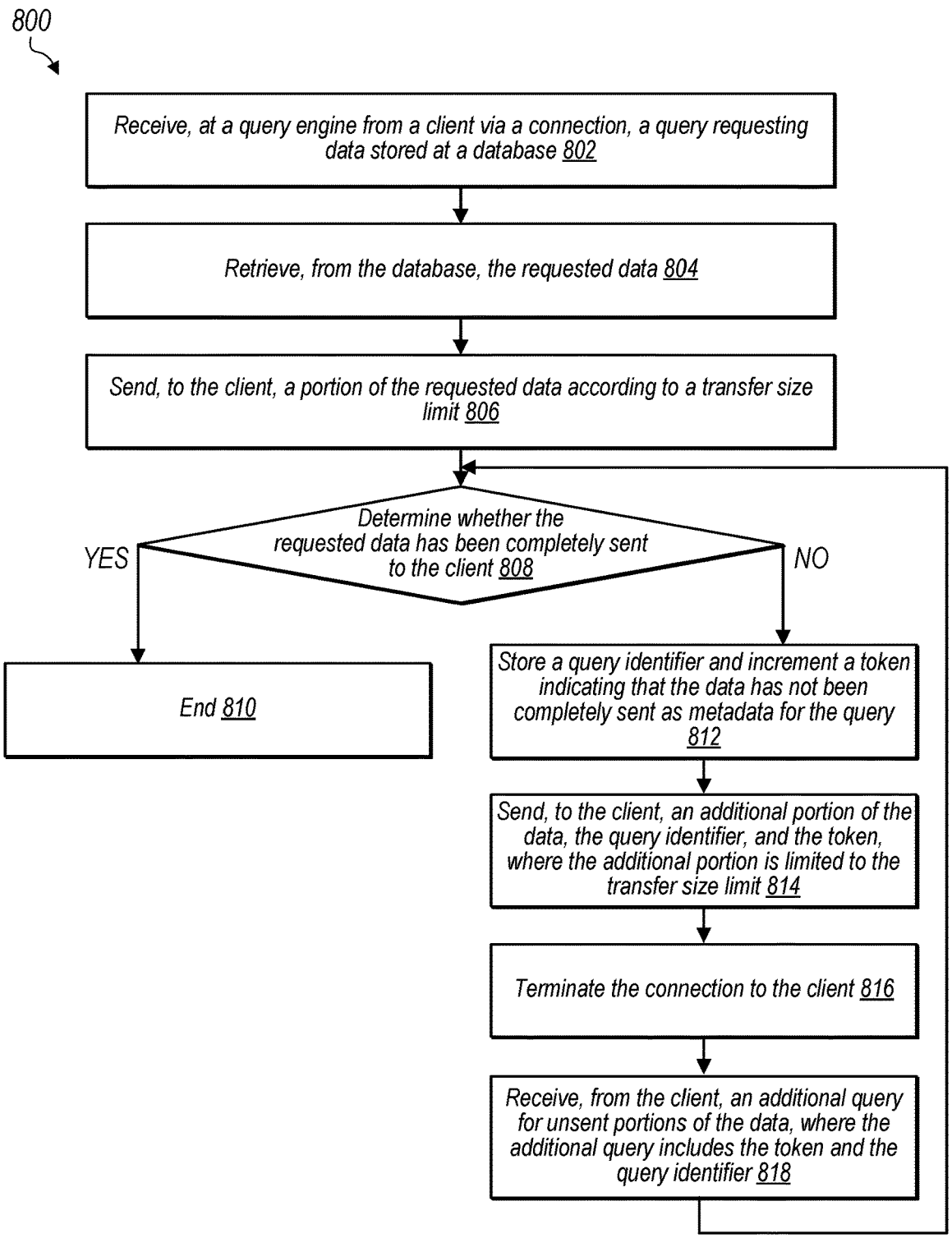
FIG. 8 illustrates a flowchart diagram of a method for a query engine of a database service to send data in response to a query, according to some embodiments.

FIG. 8 illustrates a flowchart diagram of a method 800 for a query engine of a database service to send data in response to a query, according to some embodiments. The query engine may correspond to the query engine 122 of FIG. 1, the query processing clusters 216 of FIG. 2, the query engine 304 of FIG. 3, or the query engine 404 of FIG. 4, according to some embodiments.

The method 800 may include receiving, at a query engine from a client via a connection, a query requesting data stored at a database, at 802. The query may correspond to the synchronous query 114 of FIG. 1 or the query 400 of FIG. 4, according to some embodiments. The database may correspond to the database 142 of FIG. 1, the database 208 of FIG. 2, the database 308 of FIG. 3, or the data store 518 of FIG. 5, according to some embodiments.

The method 800 may include retrieving, from the database, the requested data, at 804. In some embodiments, retrieving the requested data may include the method 600 described with respect to FIG. 6. The method 800 may incorporate the method 600 in some embodiments. In other embodiments, the query engine may be configured to perform the query with the database to retrieve the requested data.

The method 800 may include sending, to the client, a portion of the requested data according to a transfer size limit, at 806. In some situations, the transfer size limit may be a bandwidth limit that limits a quantity of data sent as a response to the query. The query engine may be configured to generate portions of the requested data when the requested data exceeds the transfer size limit. In some embodiments, the portions may be partitioned into pages that may be sent to the client at different points in time.

The method 800 may include determining whether the requested data has been completely sent to the client, at 808. In some embodiments, the query engine may be configured to determine whether the requested data has been completely sent based on metadata for the query. For example, the metadata for the query may indicate a quantity of data that has been transmitted to the client and a total size of the requested data. In other embodiments, the metadata may include a token which indicates that there are unsent portions of the requested data. Based on a determination that the requested data has been completely sent to the client, the method 800 may end, at 810.

Based on a determination that the requested data has not been completely sent to the client, the method 800 may include storing a query identifier and increment a token indicating that the data has not been completely sent as metadata for the query, at 812. In some embodiments, the query engine may be configured to maintain the metadata for queries sent to the query engine that are considered long queries that require more time to complete than the performance time threshold. The token may indicate a quantity of iterations the performance time threshold was met while performing the query.

The method 800 may include sending, to the client, an additional portion of the data, the query identifier, and the token, where the additional portion is limited to the transfer size limit, at 814. In some embodiments, the query engine may send a response to the query that includes the query identifier and the token. The response may correspond to the response 520 of FIG. 5, according to some embodiments. For example, the response may comprise a null portion reserved for the requested data, the query identifier, and the token.

The method 800 may include terminating the connection to the client, at 816. In some embodiments, the query engine may preserve bandwidth or computing resources by terminating the connection between the database service and the client. For example, the connection may incur operational costs by remaining open without an active data transfer between the client and the database service.

The method 800 may include receiving, from the client, an additional query for unsent portions of the data, where the additional query includes the token and the query identifier, at 818. The additional query may correspond to the asynchronous query 115 of FIG. 1. The additional query may include the token and the query identifier that was supplied by the database service at 814. The method 800 may return to 808 to again determine whether the requested data has been completely sent to the client.

Figure 9:
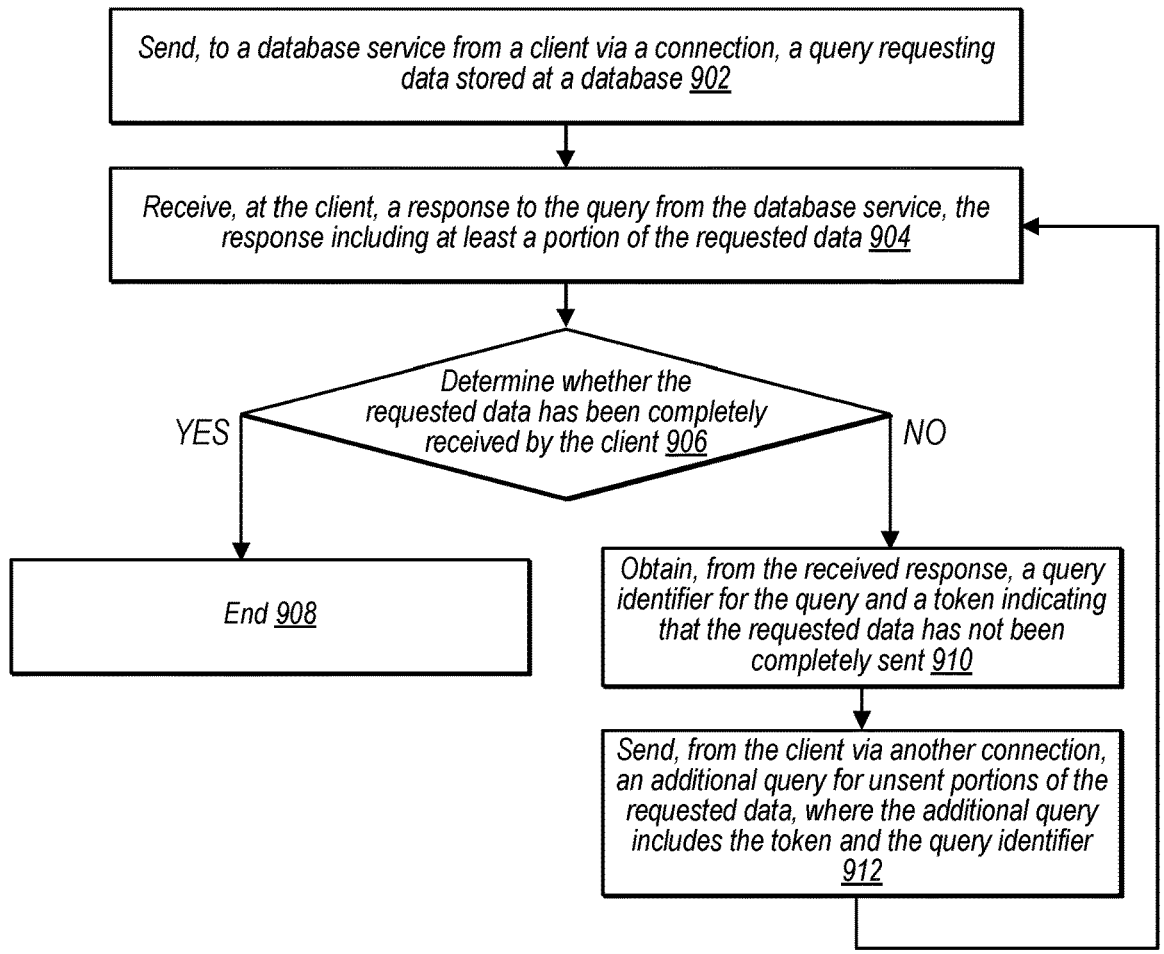
FIG. 9 illustrates a flowchart diagram of a method for a client receiving data in response to a query, according to some embodiments.

FIG. 9 illustrates a flowchart diagram of a method 900 for a client receiving data in response to a query, according to some embodiments. The client may correspond to the client 110 of FIG. 1, the clients 250 of FIG. 2, the client 302 of FIG. 3, or the client 402 of FIG. 4, according to some embodiments. In some embodiments, the method 900 may be performed by the client as a counterpart to the method 800 being performed by the query engine.

The method 900 may include sending, to a database service from a client via a connection, a query requesting data stored at a database, at 902. The database service may correspond to the database system 120 of FIG. 1, the database service 210 of FIG. 2, the database 308 of FIG. 3, or the database 408 of FIG. 4, according to some embodiments. The query may correspond to the synchronous query 114 of FIG. 1 or the query 400 of FIG. 4, according to some embodiments. The database may correspond to the database 142 of FIG. 1, the database 208 of FIG. 2, the database 308 of FIG. 3, or the data store 518 of FIG. 5, according to some embodiments.

The method 900 may include receiving, at the client, a response to the query from the database service, the response including at least a portion of the requested data 904. The response may correspond to the response 520 or the response 540 of FIG. 5, according to some embodiments. In some embodiments, the response to the query may be generated by a query engine of the database service. For example, the response to the query may be generated as described with respect to 806 or 814 of FIG. 6.

The method 900 may include determining whether the requested data has been completely received by the client, at 906. In some embodiments, the client may be configured to determine whether the requested data has been completely received based on metadata for the requested data. For example, the metadata for the query may indicate a quantity of data that has been transmitted to the client and a total size of the requested data. In other embodiments, the metadata may include a token which indicates that there are unsent portions of the requested data. Based on a determination that the requested data has been completely received by the client, the method 900 may end, at 908.

Based on a determination that the requested data has not been completely received by the client, the method 900 may include obtaining, from the received response, a query identifier for the query and a token indicating that the requested data has not been completely sent, at 910. The query identifier and the token may be used by the client to identify to the database service that a subsequent query is related to the query sent at 902.

The method 900 may include sending, from the client, an additional query for unsent portions of the requested data, where the additional query includes the token and the query identifier, at 912. The additional query may correspond to the asynchronous query 115 of FIG. 1. The additional query may include the token and the query identifier that was supplied by the database service at 910. The method 900 may return to 904 to receive an additional response to the additional query.

Figure 10:
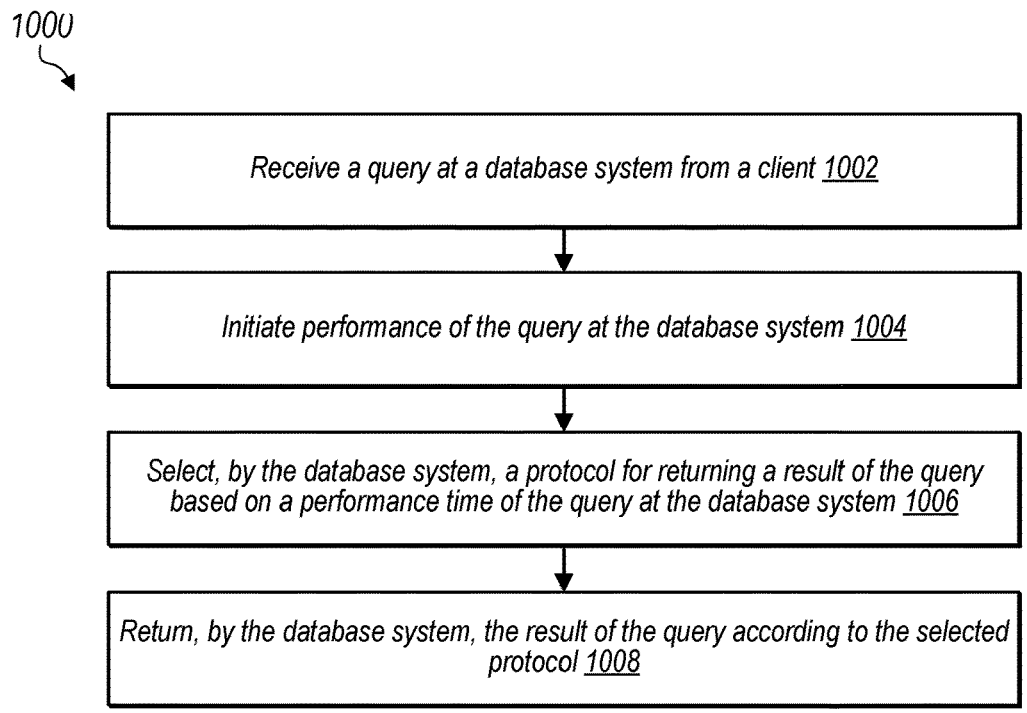
FIG. 10 illustrates a flowchart diagram for a method for processing a query at a database system, according to some embodiments.

FIG. 10 illustrates a flowchart diagram for a method 1000 for processing a query at a database system, according to some embodiments. The database system may correspond to the database system 120 of FIG. 1, the database service 210 of FIG. 2, the database 308 of FIG. 3, or the database 408 of FIG. 4, according to some embodiments.

The method 1000 may include receiving a query at a database system from a client, at 1002. The query may correspond to the synchronous query 114 or the asynchronous query 115 of FIG. 1 or the query 400 or the query 430 of FIG. 4, according to some embodiments.

The method 1000 may include initiating performance of the query at the database system, at 1004. In some embodiments, performance of the query may be initiated by implementing worker nodes configured to process the query. In some embodiments, a query engine may deploy, instantiate, or provision one or more computing devices or computing nodes to implement the query workers. For example, the query engine may obtain, lease, or acquire the computing devices to be configured to implement one or more tasks relating to performing a query at a database.

The method 1000 may include selecting, by the database system, a protocol for returning a result of the query based on a performance time of the query at the database system, at 1006. The method 1000 may include returning, by the database system, the result of the query according to the selected protocol, at 1008. In some embodiments, the database system may be configured to select a synchronous protocol or an asynchronous protocol for returning the result of the query. For example, a synchronous protocol may be configured to return the result of the query responsive to the query. As another example, an asynchronous protocol may be configured to receive a subsequent query to retrieve the result. In some embodiments, the protocol may be selected based on other criteria. For example, the protocol may be selected based on a selection indicated by the client. As another example, the client may establish a performance time threshold used to select the protocol.

Figure 11:
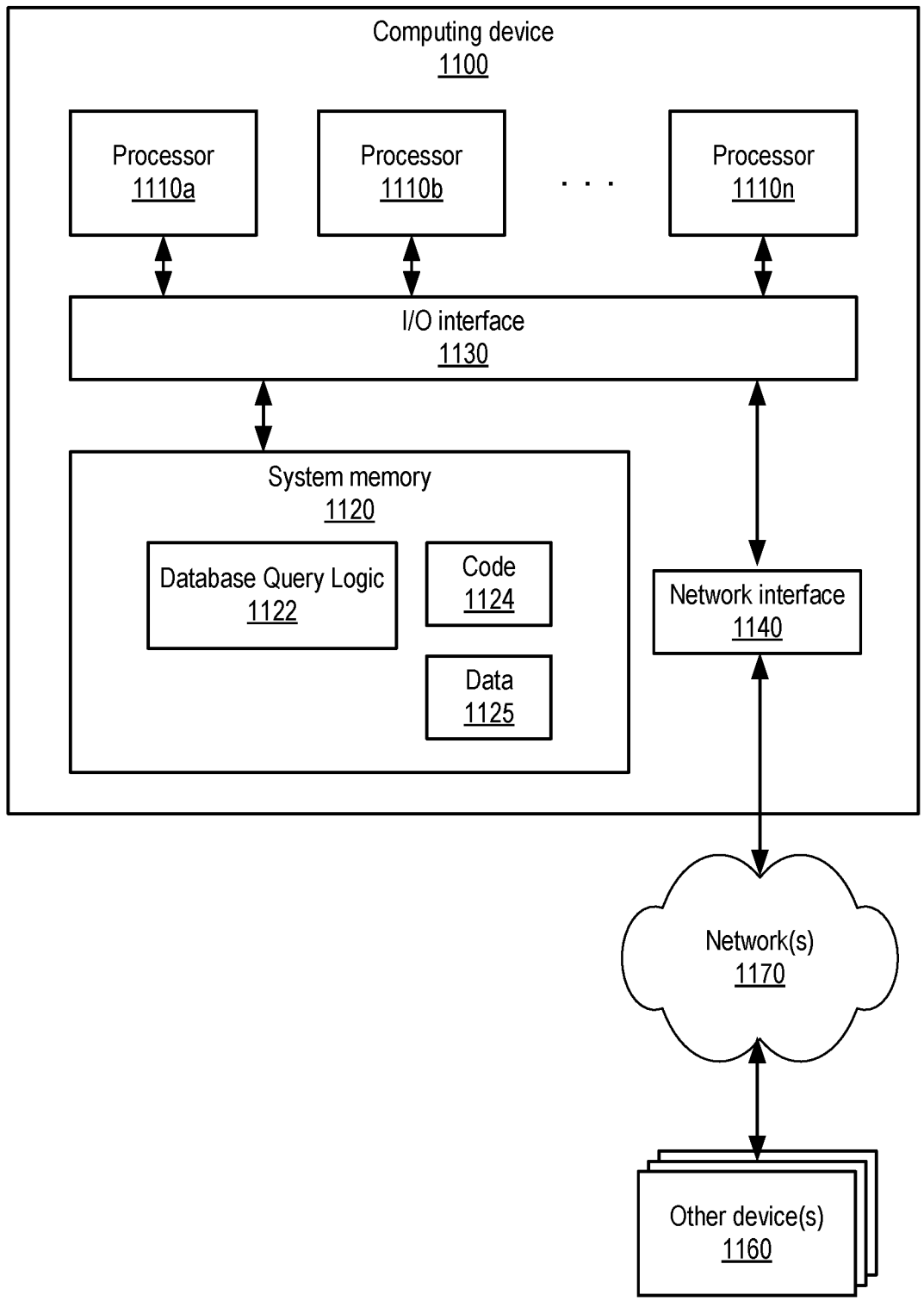
FIG. 11 illustrates a block diagram illustrating an example computer system that may be used in some embodiments.

Any of various computer systems may be configured to implement techniques for managing database queries, as disclosed herein. For example, FIG. 11 is a block diagram illustrating one embodiment of a computer system suitable for implementing some or all of the techniques and systems described herein. In various embodiments, the provider network may include one or more computer systems 1100 such as that illustrated in FIG. 11 or one or more components of the computer system 1100 that function in a same or similar way as described for the computer system 1100.

In the illustrated embodiment, computer system 1100 includes one or more processors 1110 coupled to a system memory 1120 via an input/output (I/O) interface 1130. Computer system 1100 further includes a network interface 1140 coupled to I/O interface 1130. In some embodiments, computer system 1100 may be illustrative of servers implementing enterprise logic or downloadable application, while in other embodiments servers may include more, fewer, or different elements than computer system 1100.

In various embodiments, computer system 1100 may be a uniprocessor system including one processor 1110, or a multiprocessor system including several processors 1110 (e.g., two, four, eight, or another suitable number). Processors 1110 may be any suitable processors capable of executing instructions on or across the processors 1110. For example, in various embodiments, processors 1110 may be embedded processors implementing any of a variety of instruction set architectures (ISAs), such as the x86, x86-64, ARM, PowerPC, SPARC, or MIPS ISAs, or any other suitable ISA. In multiprocessor systems, each of processors 1110 may commonly, but not necessarily, implement the same ISA.

System memory 1120 may be configured to store instructions and data accessible by processor 1110. In various embodiments, system memory 1120 may be implemented using one or more of any suitable memory technology, such as static random access memory (SRAM), synchronous dynamic RAM (SDRAM), non-volatile/Flash-type memory, or any other type of memory. In the illustrated embodiment, program instructions and data implementing desired functions, such as those methods and techniques described above for the management of securely memory compression are shown stored within system memory 1120 as program instructions 1124. In some embodiments, system memory 1120 may include data 1125 which may be configured as described herein. In some embodiments, system memory 1120 may include database query logic 1122. For example, database query logic 1122 may perform the functions of the client 110 or the database system 120 of FIG. 1, the functions of the clients 250 or the database service 210 of FIG. 2, the functions of the client 302 or the query engine 304 of FIG. 3, or the functions of the client 402 or the query engine 404 of FIG. 4.

In one embodiment, I/O interface 1130 may be configured to coordinate I/O traffic between processor 1110, system memory 1120 and any peripheral devices in the system, including through network interface 1140 or other peripheral interfaces. In some embodiments, I/O interface 1130 may perform any necessary protocol, timing or other data transformations to convert data signals from one component (e.g., system memory 1120) into a format suitable for use by another component (e.g., processor 1110). In some embodiments, I/O interface 1130 may include support for devices attached through various types of peripheral buses, such as a variant of the Peripheral Component Interconnect (PCI) bus standard or the Universal Serial Bus (USB) standard, for example. In some embodiments, the function of I/O interface 1130 may be split into two or more separate components, such as a north bridge and a south bridge, for example. Also, in some embodiments, some or all of the functionality of I/O interface 1130, such as an interface to system memory 1120, may be incorporated directly into processor 1110.

Network interface 1140 may be configured to allow data to be exchanged between computer system 1100 and other devices attached to a network, such as between client devices (e.g., 1160, etc.) and other computer systems, or among hosts, for example. In particular, network interface 1140 may be configured to allow communication between computer system 1100 and/or various other devices 1160 (e.g., I/O devices). Other devices 1160 may include scanning devices, display devices, input devices and/or other communication devices, as described herein. Network interface 1140 may commonly support one or more wireless networking protocols (e.g., Wi-Fi/IEEE 802.11, or another wireless networking standard). However, in various embodiments, network interface 1140 may support communication via any suitable wired or wireless general data networks 1170, such as other types of Ethernet networks, for example. Additionally, network interface 1140 may support communication via telecommunications/telephony networks such as analog voice networks or digital fiber communications networks, via storage area networks such as Fibre Channel SANs, or via any other suitable type of network and/or protocol.

In some embodiments, system memory 1120 may be one embodiment of a computer-accessible medium configured to store program instructions and data as described above. However, in other embodiments, program instructions and/or data may be received, sent or stored upon different types of computer-accessible media. Generally speaking, a computer-accessible medium may include computer-readable storage media or memory media such as magnetic or optical media, e.g., disk or DVD/CD-ROM coupled to computer system 1100 via I/O interface 1130. A computer-readable storage medium may also include any volatile or non-volatile media such as RAM (e.g. SDRAM, DDR SDRAM, RDRAM, SRAM, etc.), ROM, etc., that may be included in some embodiments of computer system 1100 as system memory 1120 or another type of memory. Further, a computer-accessible medium may include transmission media or signals such as electrical, electromagnetic, or digital signals, conveyed via a communication medium such as a network and/or a wireless link, which may be implemented via network interface 1140.

In some embodiments, I/O devices may be relatively simple or "thin" client devices. For example, I/O devices may be configured as dumb terminals with display, data entry and communications capabilities, but otherwise little computational functionality. However, in some embodiments, I/O devices may be computer systems configured similarly to computer system 1100, including one or more processors 1110 and various other devices (though in some embodiments, a computer system 1100 implementing an I/O device 1150 may have somewhat different devices, or different classes of devices).

In various embodiments, I/O devices (e.g., scanners or display devices and other communication devices) may include, but are not limited to, one or more of: handheld devices, devices worn by or attached to a person, and devices integrated into or mounted on any mobile or fixed equipment, according to various embodiments. I/O devices may further include, but are not limited to, one or more of: personal computer systems, desktop computers, rack-mounted computers, laptop or notebook computers, workstations, network computers, "dumb" terminals (i.e., computer terminals with little or no integrated processing ability), Personal Digital Assistants (PDAs), mobile phones, or other handheld devices, proprietary devices, printers, or any other devices suitable to communicate with the computer system 1100. In general, an I/O device (e.g., cursor control device, keyboard, or display(s) may be any device that can communicate with elements of computing system 1100.

The various methods as illustrated in the figures and described herein represent illustrative embodiments of methods. The methods may be implemented manually, in software, in hardware, or in a combination thereof. The order of any method may be changed, and various elements may be added, reordered, combined, omitted, modified, etc. For example, in one embodiment, the methods may be implemented by a computer system that includes a processor executing program instructions stored on one or more computer-readable storage media coupled to the processor. The program instructions may be configured to implement the functionality described herein (e.g., the functionality of the data transfer tool, various services, databases, devices and/or other communication devices, etc.).

Various modifications and changes may be made as would be obvious to a person skilled in the art having the benefit of this disclosure. It is intended to embrace all such modifications and changes and, accordingly, the above description to be regarded in an illustrative rather than a restrictive sense.

Various embodiments may further include receiving, sending, or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

What is claimed is:
1. A system, comprising:
one or more storage devices configured to implement a data store to store database data; and
one or more computing devices configured to implement a query engine configured to:
receive, from a client, a database query;
initiate performance of the query at the data store;
compare a performance time of the query with a performance time threshold; and
based on a determination that the performance time exceeds the performance time threshold:
send, to the client, a query identifier for the query and a token, wherein the token indicates that the query has not been completed and is useable to determine at the client a number of remaining portions of the requested data to request from the query engine to complete the query; and
receive, from the client, an additional query for at least one of the determined number of remaining portions of the requested data stored at the database, wherein the additional query comprises the token and the query identifier; or based on a determination that the performance time
does not exceed the performance time threshold:
send a response to the query to the client, the
response comprising data requested by the query.
2. The system of claim 1, wherein the query engine is
further configured to:
in response to the additional query, determine whether the
performance of the query at the data store is completed;
and
based on a determination that the performance of the
query is complete, receive the data requested by the
query and send the data to the client; or
based on a determination that the performance of the
query is not complete:
increment the token; and
send, to the client, the query identifier and the token.
3. The system of claim 1, wherein the query engine is
further configured to:
determine whether the data requested by the query
exceeds a size limit; and
to send the response to the query:
send a portion of the data requested, wherein the
portion comprises an unsent portion of the data
requested up to the size limit; and
if the data requested is not fully sent to the client, repeat
said send the portion of the data requested after a
threshold time period elapses.
4. The system of claim 1, wherein the query engine is
further configured to:
establish a connection to the client in response to the
query from the client, wherein the response to the client
is sent via the connection;
terminate the connection after the response to the client is
sent; and
reestablish the connection in response to the additional
query from the client.
5. The system of claim 1, wherein the query engine is
further configured to:
based on a determination that the performance time
exceeds the performance time threshold:
store metadata for the query, the metadata comprising
the query identifier and the token.
6. A method, comprising:
receiving a request to perform a query at a database
system from a client;
after initiating performance of the query at the database
system:
tracking, by the database system, a performance time of
the query;
based on the performance time of the query, selecting,
by the database system, a protocol from a plurality of
different result protocols supported by the database
system that causes the client to send different numbers of requests in order to obtain a result of the
query according to a determination at the client of a
number of remaining portions of the requested data
to request from the query engine based on a response
to the request to perform the query including at least
an initial portion of the requested data; and
returning, by the database system, the result of the
query to the client according to the selected result
protocol.
7. The method of claim 6, wherein selecting the protocol
comprises:
determining that the performance time is within a performance time threshold to select a synchronous protocol
as the selected result protocol, wherein the result of the
query is returned in response to the request to perform
the query.
8. The method of claim 6, wherein selecting the protocol
comprises:
determining that the performance time is not within a
performance time threshold to select an asynchronous
protocol as the selected result protocol, wherein the
result of the query is returned in response to the request
to perform the query.
9. The method of claim 8, further comprising
generating the result to the query, the result comprising a
query identifier for the query and a token indicating that
the query has not been completed; and
receiving, from the client, an additional query, wherein
the additional query comprises the token and the query
identifier.
10. The method of claim 8, wherein the asynchronous
protocol further comprises:
storing metadata for the query, the metadata comprising
the query identifier and the token;
in response to the additional query, determining whether
the performance of the query at the data store is
completed; and
based on a determination that the performance of the
query is complete, receiving the data requested by the
query and sending the data to the client; or
based on a determination that the performance of the
query is not complete:
incrementing the token; and
sending, to the client, the query identifier and the token.
11. The method of claim 10, further comprising:
in response to receiving the additional query, identifying
that the additional query is related to the query based at
least on comparing the token and the query identifier
included in the additional query to the metadata of the
query.
12. The method of claim 6, further comprising:
determine whether the data requested by the query
exceeds a size limit; and
to return the result to the query:
sending a portion of the data requested, wherein the
portion comprises an unsent portion of the data
requested up to the size limit; and
if the data requested is not fully sent to the client,
repeating said send the portion of the data requested
after a threshold time period elapses.
13. The method of claim 6, further comprising:
establishing a connection to the client in response to the
query from the client, wherein the result of the query is
sent to the client via the connection;
terminating the connection after the result of the query is
sent to the client; and
reestablishing the connection in response to the additional
query from the client.
14. One or more computer-readable storage media storing
instructions that, when executed on or across one or more
processors, cause the one or more processors to:
in response to receiving a query at a database system from
a client, initiate performance of the query at the database system;
after initiating performance of the query, select, by the
database system, a protocol from a plurality of different
protocols that causes different quantities of requests
from the client for returning a result of the query
according to a determination at the client of a number
of remaining portions of the requested data to request from the query engine based on a response to the request to perform the query including at least an initial portion of the requested data, wherein the selection is based on a performance time of the query at the database system, wherein a state of the query between requests is preserved based on the performance time; and return, by the database system, the result of the query according to the selected protocol.

15. The one or more computer-readable storage media of claim 6, wherein to select the protocol, the one or more computer-readable storage media further comprises instructions that cause the one or more processors to:

determine that the performance time is within a performance time threshold to select a synchronous protocol as the selected result protocol, wherein the result of the query is returned in response to the request to perform the query.

16. The one or more computer-readable storage media of claim 14, wherein to select the protocol, the one or more computer-readable storage media further comprises instructions that cause the one or more processors to:

determine that the performance time is not within a performance time threshold to select an asynchronous protocol as the selected result protocol, wherein the result of the query is returned in response to the request to perform the query.

17. The one or more computer-readable storage media of claim 16, wherein the one or more computer-readable storage media further comprises instructions that cause the one or more processors to:

generate the result to the query, the result comprising a query identifier for the query and a token indicating that the query has not been completed; and receive, from the client, an additional query, wherein the additional query comprises the token and the query identifier.

18. The one or more computer-readable storage media of claim 16, wherein the one or more computer-readable storage media further comprises instructions that cause the one or more processors to:

store metadata for the query, the metadata comprising the query identifier and the token;

in response to the additional query, determine whether the performance of the query at the data store is completed;

based on a determination that the performance of the query is complete, receive the data requested by the query and sending the data to the client; and based on a determination that the performance of the query is not complete:

increment the token; and send, to the client, the query identifier and the token.

19. The one or more computer-readable storage media of claim 18, wherein the one or more computer-readable storage media further comprises instructions that cause the one or more processors to:

in response to receiving the additional query, identifying that the additional query is related to the query based at least on comparing the token and the query identifier included in the additional query to the metadata of the query.

20. The one or more computer-readable storage media of claim 14, wherein the one or more computer-readable storage media further comprises instructions that cause the one or more processors to:

determine whether the data requested by the query exceeds a size limit; and to return the result to the query:

sending a portion of the data requested, wherein the portion comprises an unsent portion of the data requested up to the size limit; and if the data requested is not fully sent to the client, repeating said send the portion of the data requested after a threshold time period elapses.

\* \* \* \* \*